(No Model.) 2 Sheets—Sheet 1.

J. G. STAUNTON.
APPLIANCE FOR POULTRY HOUSES.

No. 366,699. Patented July 19, 1887.

WITNESSES
INVENTOR
his Attorneys.

(No Model.) 2 Sheets—Sheet 2.

J. G. STAUNTON.
APPLIANCE FOR POULTRY HOUSES.

No. 366,699. Patented July 19, 1887.

Witnesses
Wm. R. Mackrille.
Ella S. Johnson.

Inventor
J. Galusha Staunton
By his Attorneys
Johnson & Johnson

United States Patent Office.

J. GALUSHA STAUNTON, OF ELLICOTTVILLE, NEW YORK.

APPLIANCE FOR POULTRY-HOUSES.

SPECIFICATION forming part of Letters Patent No. 366,699, dated July 19, 1887.

Application filed December 30, 1886. Serial No. 222,994. (No model.)

*To all whom it may concern:*

Be it known that I, J. GALUSHA STAUNTON, a citizen of the United States, residing at Ellicottville, in the county of Cattaraugus and State of New York, have invented new and useful Improvements in Appliances for Poultry-Houses, of which the following is a specification.

This invention consists of a device to be used in a poultry-room in connection with a perch for fowls for the double purpose of catching the droppings therefrom and for distributing dust over the floor of the room as desired, in order to promote cleanliness and aid in the prevention or destruction of vermin. It consists of a tray mounted upon ways or slide-rails fastened to the walls of the room, so that it may be moved the entire length thereof with a vibrating or jarring motion to liberate the dust contained in the tray, and then returned to its place under the perch. As a poultry-house appliance it serves the two purposes of dusting the floor and as a receptacle for the excrement from the fowls when on the roost, thus rendering it an important implement for aiding the prevention or destruction of vermin and promoting cleanliness in a poultry-room having appliances for feeding, watering, and nesting. Provision is also made for holding the tray or pan in a tilted position upon the walls of the poultry-room at the front thereof while cleaning the tray.

Figure 1:
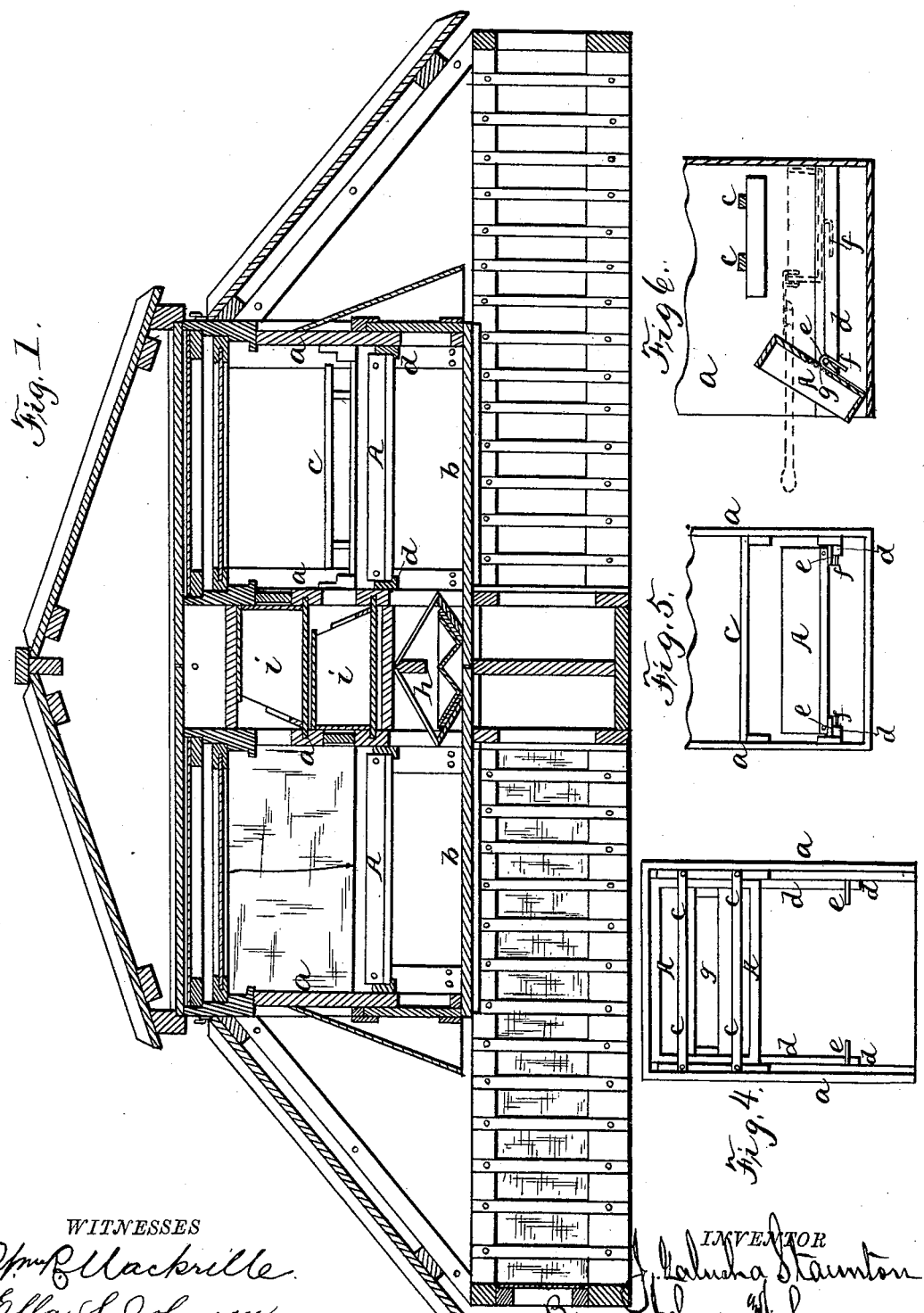
Figure 2:
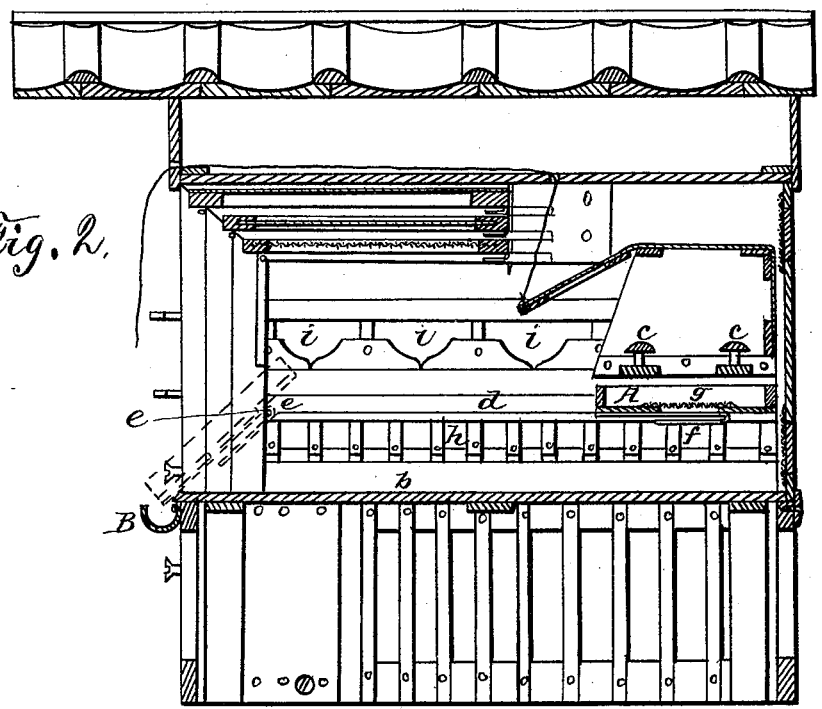
Figure 3:
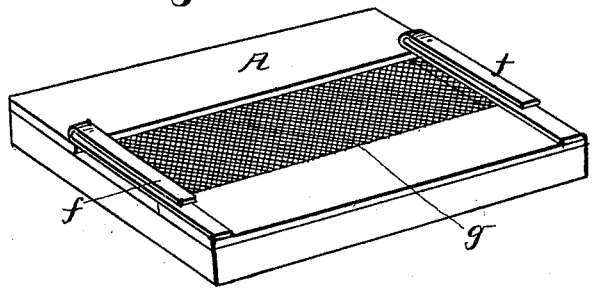

In the accompanying drawings, Figure 1 is a vertical longitudinal sectional view of a poultry-house, showing the perch and the dusting-tray supported by the slide-rails on the walls thereof above the floor; Fig. 2, a vertical cross-sectional view of the same, the dusting-tray being shown in its relation to the perch and in its function as floor-duster; and Fig. 3 is a perspective view of the dusting-tray reversed. Fig. 4 is a top view of the perch-pan and the walls of a poultry-room. Fig. 5 is a front view of the same; and Fig. 6 is a vertical sectional view of the same, showing the perch-pan in the position for dumping the dirt, its position in dotted lines under the perch, and the handle-hook by which it is slid back and forth upon the wallways in the operation of dusting the floor of the room.

$a$ $a$ are the vertical walls, and $b$ the floor, of a poultry-room; $c$ $c$, the poles of the perch, which may be of any suitable construction and secured in any suitable way upon the walls. A few inches below the perch are fastened to the vertical walls horizontal ways or slide-rails $d$, which extend nearly the entire length of the room and form a track for the support and movement of a shallow tray, A, which is supplied with dust for the purposes stated. $e$ are iron pins driven into the wall just at the front end of the slide-rail and projecting sufficiently beyond their inner sides to catch the hook $f$ on the bottom of the dusting-tray as it is drawn forward for removing the droppings. These hooks are attached to the bottom of the tray close to its ends and at a point back of the center, which allows the tray as the hooks come in contact with the pins to tilt forward and downward to the floor, bringing its front edge directly over the trough B or other receptacle for the contents as they are removed. The pins and hooks prevent the tray from being drawn too far forward and hold it in position while being cleaned, as shown in Fig. 2.

The width of the tray is somewhat greater than that of the area occupied by the fowls on the perch or perches in connection with which it is used, and its length sufficient to allow it to rest securely upon the wallways or track. Its bottom has an open section, $g$, covered with wire-cloth to form a sieve or duster. When operated as a duster, it is moved backward or forward upon the track with a jarring or vibratory motion to set free the dust by means of a suitable-hooked handle constructed to grasp the front edge of the tray, as shown by dotted lines in Fig. 6, whereby a thin coating of road-dust is scattered over the floor for the purposes stated. The tray is then returned to its place under the perch to catch the droppings.

$h$ is the feed and water trough in the wall at the floor, and $i$ the nesting-boxes in the wall above the floor.

I claim—

1. The combination, with a poultry-room having perches, of ways or slide rails beneath said perches, and a pan or tray mounted and movable upon said ways, substantially as shown, and for the purpose specified.

2. The combination, with a poultry-room having perches, and ways or slide-rails on the walls thereof beneath said perches, provided with pins at their front ends, of a dusting-pan having a reticulated bottom movable upon said ways and provided with hooks on its under side, whereby said pan may be dumped at the front of said room or removed therefrom, substantially as described.

3. A perch-tray and dusting-pan for poultry-rooms, having a narrow cross-opening, $g$, in its bottom, covered with wire-cloth, and provided with hooks $ff$ on its under side, in combination with a poultry-room having perches, horizontal ways or slide-rails projecting from the opposite walls of said room, and pins projecting from said walls at the front ends of said ways in horizontal line with said tray-hooks, substantially as described, for the purpose specified.

In testimony whereof I have hereunto set my hand in the presence of two subscribing witnesses.

J. GALUSHA STAUNTON.

Witnesses:
   H. D. PERSONS,
   H. M. PERSONS.